Feb. 4, 1941.   F. W. CURTIS   2,230,716
TABLE DRIVE FOR MILLING MACHINES
Filed Jan. 29, 1940   2 Sheets-Sheet 1
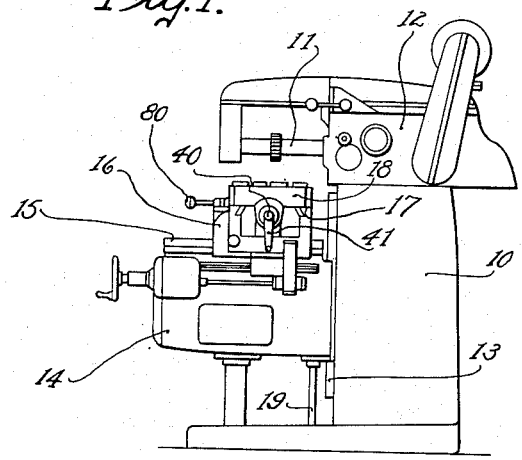
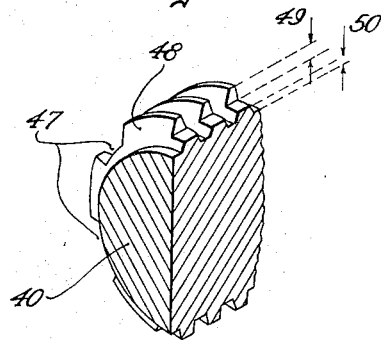
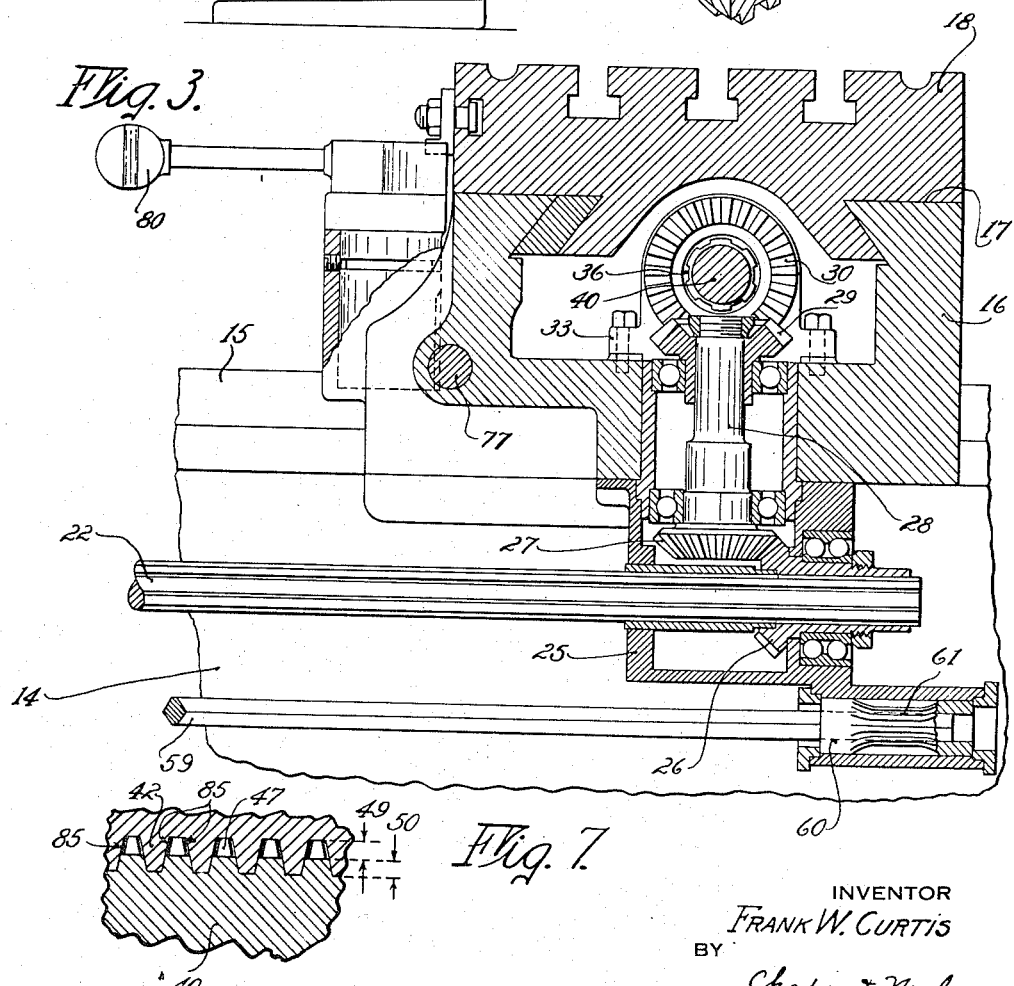
INVENTOR
Frank W. Curtis
BY
Chapin & Neal
ATTORNEYS Feb. 4, 1941.  F. W. CURTIS  2,230,716
TABLE DRIVE FOR MILLING MACHINES
Filed Jan. 29, 1940  2 Sheets-Sheet 2
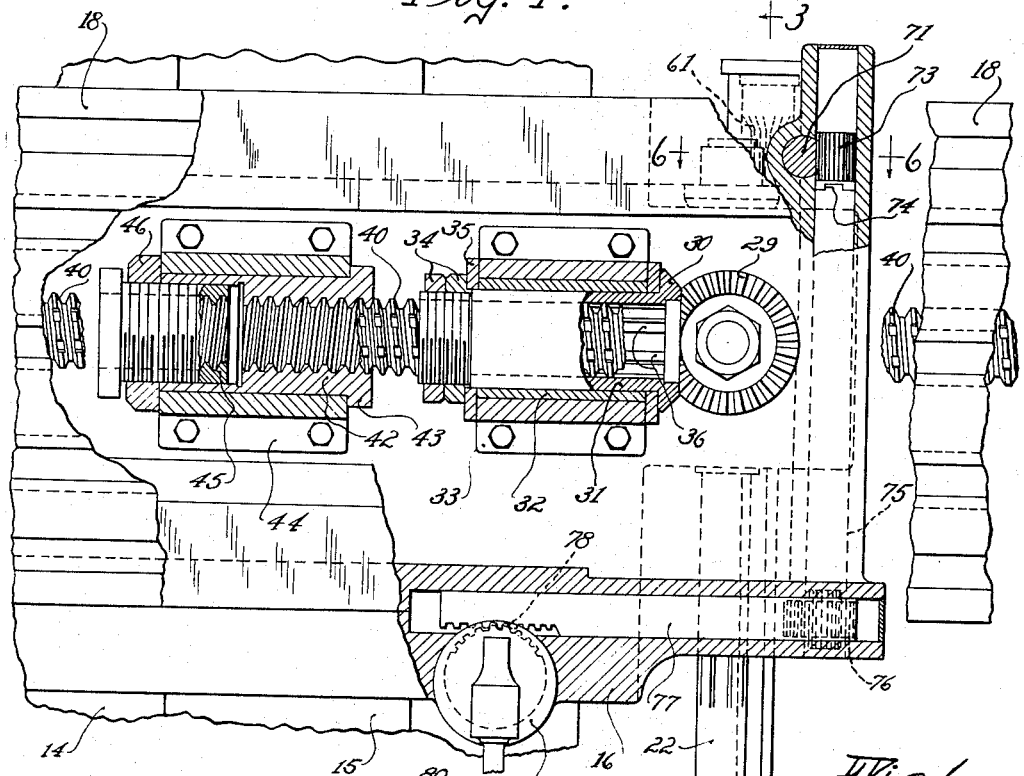
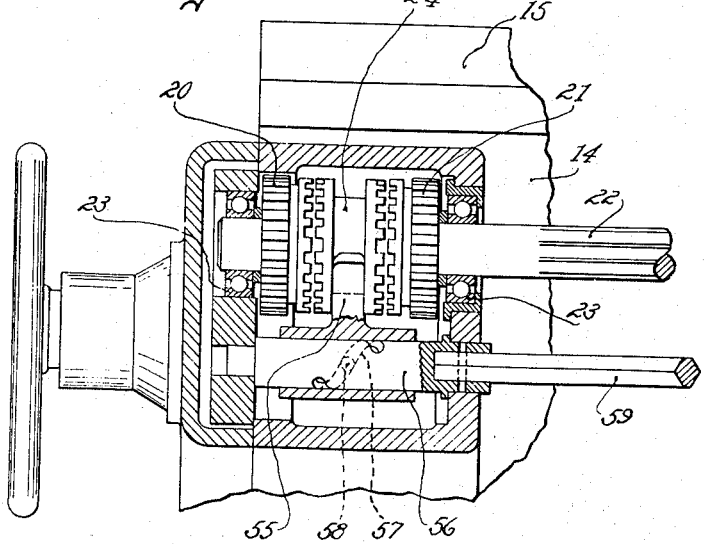
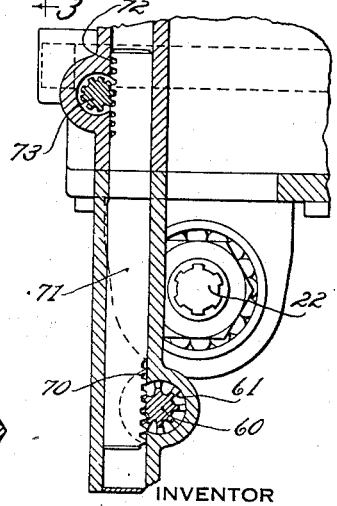
INVENTOR
FRANK W. CURTIS
BY
Chapin + Neal
ATTORNEYS Patented Feb. 4, 1941

2,230,716

UNITED STATES PATENT OFFICE 2,230,716

TABLE DRIVE FOR MILLING MACHINES

Frank W. Curtis, Springfield, Mass., assignor to Van Norman Machine Tool Company, Springfield, Mass., a corporation of Massachusetts Application January 29, 1940, Serial No. 316,081

9 Claims. (Cl. 90—21)

In the construction of reciprocating tables for machine tools such as milling machines, the table is generally reciprocated by means of a long screw journaled at each end to the table and rotating in a nut mounted on the saddle or other part of the machine upon which the table slides. In order to permit manual feed of the table by rotating the screw at either end, it is necessary to have the nut fixed in the saddle and to provide means also carried by the saddle for rotating the screw by power. For this purpose it has been customary to pass the screw through a rotating collar with which it had a splined connection. It is one object of the present invention to improve the character of this splined connection in a manner to prevent binding of the parts, to increase the continuity of the driving action and to increase the strength of the screw itself. It is a further object of the invention to improve the manner of driving and controlling the screw so that the controlling mechanism may be located in the knee structure of the milling machine instead of in the saddle adjacent the table as is usually the case. In this manner the bulk of the parts adjacent the table is greatly reduced and a stronger and more rigid table results. Additional objects will appear from the following description and claims.

Referring to the drawings:

Fig. 1 is a side elevation of a milling machine embodying the present invention;

Fig. 2 is a perspective detail, partly in section, showing the construction of the table feeding screw;

Fig. 3 is a transverse section through the table, taken on line 3—3 of Fig. 4;

Fig. 4 is a top plan view of the table, saddle and knee with certain parts broken away;

Fig. 5 is a detail of the knee structure showing the table reversing clutch;

Fig. 6 is a detail section on line 6—6 of Fig. 4; and

Fig. 7 is an enlarged detail view of a modified form of the screw structure shown in Fig. 2.

The invention has been shown as applied to a milling machine although in certain aspects it may have a broader application. The particular milling machine chosen for illustration has a column 10 on which a tool spindle 11 is carried by means of a horizontally movable ram 12. Vertically slidable on ways 13 on the column is a knee structure 14 having horizontal ways 15 upon which a saddle 16 slides toward and from the column. The saddle is provided with longitudinally extending ways 17 upon which the table 18 reciprocates. The knee may be moved vertically and the saddle moved horizontally by manual and power mechanism of any desired type which it is not necessary to illustrate here.

A power shaft 19 (Fig. 1) extends vertically from the base of the column into the knee where it is received telescopically, and where it transmits its power by any desired form of gearing to a pair of table driving gears 20 and 21 (Fig. 5) which rotate in opposite directions and form a reversing couplet. Extending coaxially with these gears is a splined shaft 22 journaled in bearings 23 at the front of the knee and having keyed to it a reversing clutch 24 by which it may be rotated in either direction. This shaft extends rearwardly through a housing 25 (Fig. 3) carried by the saddle, and in which is journaled a bevel gear 26 with which the shaft has splined connection. The gear 26 meshes with a bevel gear 27 on a stub shaft 28 journaled for rotation on a vertical axis in the saddle and bearing at its upper end a bevel gear 29 meshing with a bevel gear 30. The latter gear (Fig. 4) is formed with an integral sleeve 31 extending through a bushing 32 carried by a bracket 33 secured to the saddle. The sleeve 31 is threaded at its end remote from the gear 30 to carry lock nuts 34 which bear against a collar 35 and prevent endwise movement of the sleeve. The inner surface of the sleeve has a plurality of inwardly projecting splines 36 (Fig. 3) which are constructed as will be described later.

The table driving screw 40 is journaled at each end in the table and may have hand wheels or cranks 41 by which it may be rotated manually. In addition to having a splined connection with the sleeve 31, as will be described below, this screw is threaded into a nut 42 having a flange 43 at one end adapted to rest against the end of a bracket 44 held in any desired way to the saddle. The other end of the nut is internally threaded and receives a member 45 held in adjusted position by a lock nut 46. The member 45 is provided with screw threads similar to those within the nut and forms in effect a continuation of the nut which may be adjusted in longitudinal position so as to permit wear being taken up.

The screw 40, which has been shown in perspective detail in Fig. 2, has a novel thread and spline-grooved arrangement as will now be discussed. The customary manner of constructing a spline-groove on a screw shaft is to cut it into the body of the shaft completely through the threads so that the threads are interrupted at the points where the spline-grooves are located.

In contrast with this the shaft 40 is provided with a plurality of longitudinally extending grooves 47 which are cut inwardly only partway to the bottom of the threads 48. This has been indicated by the dimensions 49 and 50, the former of which represents the depth of the spline-grooves, and the latter the residual depth of the threads below the bottom of the spline-grooves. The result of this arrangement is that the threads of nut 42 have continuous engagement with the portion 50 and an interrupted engagement with the portion 49 due to the spline-grooves 47.

The screw can be constructed by cutting a thread of normal depth on screw 40 and then cutting the spline-grooves 47 so that they do not extend the full depth of the thread. However, in the preferred arrangement, the thread of screw 40 is first cut so that the dimension 49—50 is more than the normal thread depth by the amount represented by dimension 49. Then when the spline-groove 47 is cut, the portion 50 which is in continuous engagement with the threads 42 is of the same depth as would ordinarily exist in case the screw threads 48 had no spline-grooves cut in them. That is, portion 50 is of sufficient depth to give the desired strength for the shifting of table 18 by interengagement of screw 40 and nut 42. On the other hand, dimension 49 is such as to give the desired strength for splines 36 of the sleeve 31 to impart torque to screw 40. One result of this arrangement is that there is no weakening of the screw thread engagement between screw 40 and nut 42 because the normal thread of depth 50 is not interrupted by spline-grooves 47.

Furthermore, due to the use of a plurality of splines, their driving torque is distributed uniformly around the circumference of the screw, thereby eliminating any tendency to bind. It is desirable to use at least four splines, six being preferable. Without using the principles of this invention this number of splines could not be used without seriously weakening the screw. It should be noted that while the longitudinal force exerted by the screw on the nut is carried in the main by the thick bases of the threads which are not interrupted, the interrupted outer portions provide additional surfaces in engagement with the nut to increase the strength of the structure. In this way a wholly novel combination of strength under torque and strength in a longitudinal direction results.

Referring to Fig. 7, the screw 40 of Fig. 2 may be modified by relieving the lateral walls of the threads from the base of the groove outward to the top of the thread, as indicated at 85, so that the interrupted portions do not contact the threads of nut 42. One reason for doing this is as follows. As the screw is rotated, and the screw and table moved laterally, the edges of the spline-grooves where they intersect the slanting sides of the thread on screw 40 may become upset due to the heavy force resulting from sliding engagement with splines 36 on sleeve 31. This results in burrs which act like numerous cutters disposed radially around the axis of screw 40, and these burrs score that portion of the threads on nut 42 which engages the interrupted portions of the thread on the screw 40. This action may eventually cause a loose engagement of nut 42 and screw 40. With the interrupted portions of the thread relieved as shown, whatever upsetting occurs will be harmless inasmuch as the upset edges cannot score the nut.

The clutch 24 is provided with a shifting member 55 (Fig. 5) mounted to slide upon a rotatable shifter cam 56. The cam has a helical groove 57 receiving a pin 58 on the shifter so that as the cam is rotated the shifter will be moved in one direction or the other to cause rotation of the shaft 22 in the desired direction. Fitting into one end of the cam is a squared or hexagonal shaft 59, the rear end of which slides freely in a member 60 journaled in the bracket 25 and has its central portion formed with gear teeth 61. The gear teeth 61 (Fig. 6) mesh with teeth 70 on a rod 71 mounted for vertical reciprocation in the saddle and has teeth 72 near its upper end meshing with a gear 73 having a detachable driving connection 74 (Fig. 4) with a shaft 75 extending from front to back in the saddle. This shaft has a geared connection 76 with a rod 77 reciprocable longitudinally in the saddle. Shaft 77 has a geared connection 78 with a rotatable member 79 provided with a handle 80. By swinging the handle 80 upon its vertical axis the clutch 24 may be shifted to cause the table to drive in one direction or the other or by leaving the handle as shown in Fig. 4 the clutch may be maintained in neutral position. The parts shown are preferably arranged so that the direction of drive of the table will correspond to the direction in which the handle is moved.

What I claim is:

1. A drive for the tables of milling machines and the like comprising a table, a table support, a screw rotatably secured adjacent its ends to the table and having screw threads formed intermediate its ends, a nut secured to the table support and engaging the threads on the screw, the screw being formed with a plurality of spline-grooves extending part way only of the depth of the screw threads, and a driving member carried by the table support and having splines engaging said grooves to impart rotation to the screw.

2. A drive for the tables of milling machines and the like comprising a table, a table support, a screw rotatably secured adjacent its ends to the table and having screw threads formed intermediate its ends, a nut secured to the table support and engaging the threads on the screw, said nut being formed in two longitudinally separated portions, means for holding said portions in longitudinally adjusted position, the screw being formed with a plurality of spline-grooves extending part way only of the depth of the screw threads, and a driving member carried by the table support and having splines engaging said grooves to impart rotation to the screw.

3. A drive for the tables of milling machines and the like comprising a table, a table support, a screw rotatably secured adjacent its ends to the table and having screw threads formed intermediate its ends, a nut secured to the table support and engageable with the threads on the screw, the screw being formed with six spline-grooves each extending part way only of the depth of the screw threads, and a driving member carried by the table support and having six splines each engaging one of said grooves to impart rotation to the screw.

4. A drive for the tables of milling machines and the like comprising a knee, a saddle, a table, a screw rotatably secured adjacent it ends to the table and having screw threads formed intermediate its ends, a nut secured to the saddle and engaging the threads on the screw, a driving member carried by the saddle and having a splined connection with the screw, a reversing gear couplet mounted on the knee, a clutch engageable with either of the gears of said couplet, a splined shaft extending from said clutch, gearing connecting said splined shaft with the driving member on the saddle, a clutch control member mounted on the saddle, and connections between said control member and the clutch on the knee to operate the same.

5. A drive for the tables of milling machines and the like comprising a knee, a saddle, a table, a screw rotatably secured adjacent its ends to the table and having screw threads intermediate its ends, a nut secured to the saddle and engaging the threads on the screw, the screw being formed with a plurality of spline-grooves extending part way only of the depth of the screw threads, a driving member carried by the saddle and having splines engaging said grooves to impart rotation to the screw, a reversing gear couplet mounted on the knee, a clutch mounted on the knee for engagement with either gear of said couplet, a splined shaft extending from said clutch, and gearing connecting said splined shaft with the driving member on the saddle.

6. In a machine tool having a pair of members mounted for relative reciprocation, a splined screw on one member, a nut fixed on the other member, and an inwardly splined tubular driving member surrounding said screw and mounted on the other member with the nut engaging the threads and the splined driving member the spline-grooves of said screw, the threaded portion of said screw having a plurality of radial spline-grooves cut inwardly from the periphery of the screw to a depth less than the depth of the threads.

7. A drive for the tables of milling machines and the like, comprising a table, a table support, a screw rotatably secured adjacent its ends to the table and having screw threads formed intermediate its ends, a nut secured to the table support and engaging the threads on the screw, the screw being formed with a plurality of spline-grooves extending part way only of the depth of the screw threads and a driving member carried by the table support and having a splined driving connection with said grooves, the threads on said screw being complementary in thickness to that of the nut from the root of the thread to the bottom of the spline-groove and with their side walls relieved inwardly from the bottom of the groove to the top of the thread.

8. A drive for the tables of milling machines and the like, comprising a table, a table support, a screw rotatably secured adjacent its ends to the table and having screw threads formed intermediate its ends, a nut secured to the table support and engaging the threads on the screw, the screw being formed with a plurality of spline-grooves extending part way only of the depth of the screw threads and a driving member carried by the table support and having a splined driving connection with said grooves, the threads on said screw and nut being complementary in thickness and in contact from the root of the thread on the screw to a point about halfway to the top of said thread, with the side walls of said thread relieved inwardly from said midpoint to the top.

9. In a machine tool having a pair of members mounted for relative reciprocation, a splined screw on one member, a nut fixed in the other member, and an inwardly splined tubular driving member surrounding said screw and mounted on the other member with the nut engaging the threads and the splined driving member the spline-grooves of said screw, and with the threaded portion of said screw having a plurality of radial spline grooves cut inwardly from the periphery of the screw to a depth less than the depth of the threads, the lateral faces of the threads in said nut and the threads on said screw being in engagement from substantially the base of the grooves inwardly to the root of the thread on the screw and spaced apart from the base of said groove to the top of the thread on said screw.

FRANK W. CURTIS.